United States Patent [19]

Baker

[11] Patent Number: 4,515,527

[45] Date of Patent: May 7, 1985

[54] CENTER PLATE-BLADE INTERCONNECTION ON A CENTRIFUGAL BLOWER WHEEL

[75] Inventor: Harold L. Baker, Cleveland, Ohio

[73] Assignee: Morrison Products, Inc., Cleveland, Ohio

[21] Appl. No.: 389,757

[22] Filed: Jun. 18, 1982

[51] Int. Cl.³ .................................... F04D 29/28
[52] U.S. Cl. .................................. 416/184; 415/98; 416/199
[58] Field of Search ............... 416/184, 199, 187; 415/98, 102

[56] References Cited

U.S. PATENT DOCUMENTS

| 3,055,578 | 9/1962 | Mayne et al. | 416/184 |
| 3,080,105 | 3/1963 | Merz | 416/184 |
| 3,711,914 | 1/1973 | Baker | 29/156.8 CF |

FOREIGN PATENT DOCUMENTS

| 222290 | 8/1958 | Australia | 416/187 |
| 2621199 | 11/1977 | Fed. Rep. of Germany | 416/184 |

*Primary Examiner*—Everette A. Powell, Jr.
*Attorney, Agent, or Firm*—Body, Vickers & Daniels

[57] ABSTRACT

A center plate-blade attachment configuration for a centrifugal blower wheel which gives improved high speed rupture strength and improved resistance to the center plate slipping circumferentially relative to blades. The inner edge of each blade is provided with a T-shaped notch and the edges of the two discs forming the center plate are forced axially into the slots forming the ends of the head of each T, a distance such that the edges of the disc and the base of the slot are plastically deformed.

14 Claims, 4 Drawing Figures

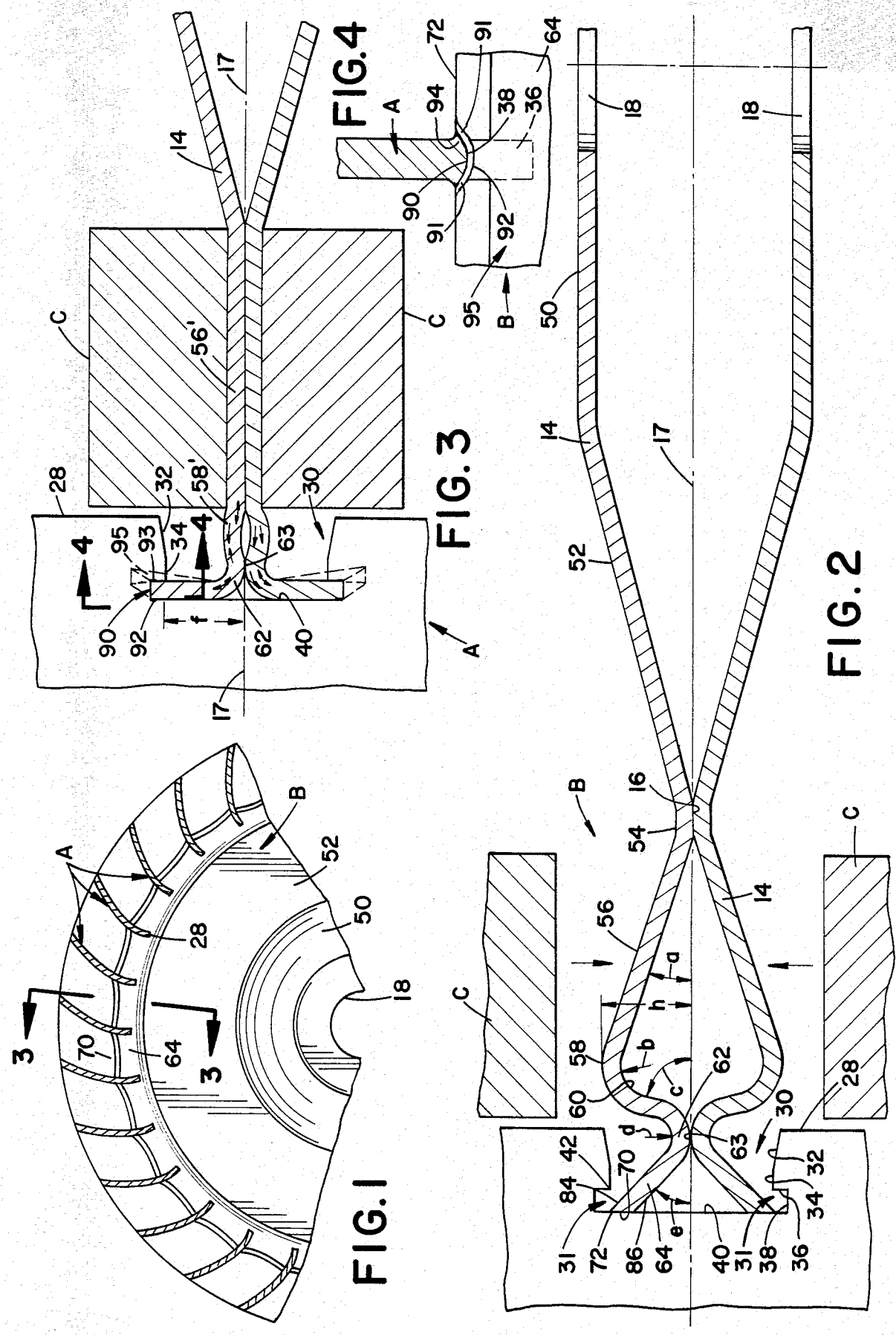

CENTER PLATE-BLADE INTERCONNECTION ON A CENTRIFUGAL BLOWER WHEEL

This invention pertains to the art of centrifugal type blower wheels and, more particularly, to an improved arrangement for fastening the edge of the supporting plate to the blades of the wheel.

Centrifugal type blower wheels of the type to which this invention pertains are normally comprised of a plurality of elongated, axially extending blades which are arcuate in transverse cross section and held in spaced relationship by end rings crimped over the ends of the blades and supported for rotation on a shaft by means of a center plate fastened to the middle of the inner edge of each blade.

BACKGROUND OF THE INVENTION

Typical patents showing various modes of fastening the center plate to the blades are: the Mayne, U.S. Pat. No. 3,055,578, under which the assignee of the present application was a licensee; the Baker, U.S. Pat. No. 3,711,914, owned by the assignee of this application; the Merz, U.S. Pat. No. 3,080,105; and, the Ranz, U.S. Pat. No. 3,737,966.

The last-mentioned patent has a single center plate, the outer edge of which has a plurality of slots therein to receive the inner edges of the blades. These slots formed by slitting the plate edge radially, and bending the metal on each side of the slot out of the plane of the plate. The inner edges of the blades are placed in the slots so formed and the bent edges of the slits are bent back into the plane of the plate to tightly grip the inner edges of the blade.

In the first-mentioned patent, the middle of the inner edge of each blade is provided with a notch. A pair of abutting discs form the center plate. These discs initially each have circumferentially extending axial bulges adjacent to but spaced from the outer edge such that when edges are placed in the notches and the bulges are flattened by forming dies, the outermost edges of the discs move axially apart and into pressure engagement with the sides of the notches. In the first-mentioned patent, the sides of the notches are generally parallel. In the patent to Merz, the sides diverge outwardly from the radial plane at an angle of about 8° (scaling from the drawing)

The present invention is an improvement on the general type of structure shown in the Mayne, Baker and Merz patents wherein the center plate is made up of two abutting discs so shaped that when the bulges are flattened, the outer edges of the discs move outwardly and apart into engagement with the sides of the notches.

Centrifugal type blower wheels are often subjected to severe operating conditions for prolonged periods. For example, a blower wheel may run continuously for twenty to twenty-five years. During such time, they are subjected to continual mechanical stresses and vibration which can result in fatigue failure of the blade attachment to the center plate. Failure of a blower wheel can have serious consequences.

It is impractical to operate a blower wheel for such prolonged periods to determine if fatigue failures will result. However, it is believed that the chances of fatigue failure increase as the normal operating speed approaches the "bursting speed"., that is the rotational speed at which the blade-plate attachment failes. The quality of the attachment of the center plate to the blades can be rated by the bursting speed of the assembled wheel.

Bursting speed failure of the wheels using the double disc supporting plate shown in Merz results when the edges of the discs are forced toward each other by the wedging action of the notch side walls on the disc edges force the edges axially toward each other a sufficient amount that the inner corners of the notches can pass by the edges of the discs. In Mayne, there is only the friction of metal against metal to resist the radial forces.

A further way of rating blower wheels has been to determine the deflection of the wheel both axially and diametrically as the speed of the wheel is increased during a bursting speed test.

Another problem with blower wheels has been failure due to the center support plate slipping circumferentially relative to the blades. The ability of a blower wheel to resist slipping can be determined by a stationary slip-torque test wherein the blades are restrained from rotation and an increasing torque is imposed on the supporting plate until slippage actually results.

As the diameter and rotational speed of centrifugal type blower wheels increase, these problems of fatigue failure, deflection and slippage of the plate relative to the blades becomes an important factor in the design and manufacture of blower wheels.

THE INVENTION

The present invention contemplates a new and improved method and arrangement for fastening the edges of the center plate to the inner edges of the blower blades which gives a high bursting and torque strength and which is simple in construction and economical to manufacture.

In accordance with the invention, the inner edges of the blower blades are each provided with a T-shaped notch and the edges of the pair of discs forming the center plate extend generally axially into the slots forming the head of the T. By a T-shaped notch is meant a notch which is substantially wider at its base than at its minimum width closer to the notch opening and the side walls of the notch have an abrupt angular corner forming T-leg defining surfaces and T-head defining surfaces, the latter defining with the notch base axially extending slots.

This feature of the disc edges extending generally axially into the slots alone results in an improved bursting strength because the centrifugal radial forces acting to pull the blades outwardly away from the edges of the discs are resisted by abutting surfaces which are generally perpendicular to the radial force.

Also, the corner is relatively closer to the plane defined by the abutting surfaces of the two discs resulting in a lower force moment on the edges of the discs which force moment normally acts to bend the edges outwardly and contribute to early failure.

Using the present invention, failure at the bursting speed normally occurs by a tearing or bending away of the portion of the blade radially inwardly of the slots rather than by the edges of the discs collapsing towards each other due to the resultant high axial forces generated thereon by the angled surfaces forming the sides of the notches as in the prior art.

Further in accordance with the invention, the discs and slots are so relatively dimensioned that when the bulges in the discs are flattened, the peripheral edges of the discs are moved against the bases of the slots with such force that not only the edges, but the bases of the slots are plastically deformed or mashed, so that the edges and slot surfaces are tightly and intimately locked together.

In effect, the edge has a notch formed therein by the slot base and the plastic flow of the metal of the edge due to the formation of this notch results in a thickening of the edges so that the sides of the disc immediately adjacent the edges are in firm pressure engagement with the radially inner and outer sides of the slot. Additionally, it may be said that the base of the slot is plastically deformed such that the upset metal intimately surrounds the disc edges.

Further in accordance with the invention, the outermost edge or corner of each disc has a notch for each blade in which the slot base is positioned and also has a plastically deformed bulge adjacent the notch base which forcibly engages the inner and outer surfaces portion of the slots. This notching and bulging occur as a result of so inter-relating the axial width of the slot and the disc dimensions prior to flattening of the disc bulges that there will be an interference between the disc edges and the slot bases and plastic flow of the metal forming the disc edges resulting in this physical inter-relationship of the disc and blade notches.

Further in accordance with the invention, the bulge in each disc is only partly flattened leaving a small circumferentially extending bulge on each side of abutting surfaces under residual internal tension and/or compression stresses which continually act to bias the disc edges into pressure engagement with the slot surfaces.

Further in accordance with the invention, the outermost edge or corner of each disc is beveled relative to its transverse thickness at an angle of at least 30° and preferably 45° or more so as to present a sharp or knife edgecorner which will be more easily plastically deformed when this sharp corner is jammed against the slot bases during the assembly operation. This plastic deformation results in: (1) A notch in the disc edge in which the base of the slot is tightly located; and, (2) a burring, bulging or mushrooming action of the metal adjacent the notch base such that the displaced metal flows radially against and around the side walls of the slot resulting in a firmer and more positive locking action.

Bursting speed and torque strength have been substantially increased.

OBJECTS

The principal object of the invention is the provision of a new and improved centrifugal type blower wheel which has a high bursting speed and a maximum resistance against torque before slipping.

Another object of the invention is the provision of a new and improved centrifugal type blower wheel wherein the inner edge of each blade is provided with a T-shaped notch and the discs are so formed and dimensioned prior to assembly that on assembly their outer edges are driven into the slots defining the head of the T with such force as to notch the outer edge.

Another object of the invention is the provision of a new and improved blower wheel of the type described wherein the inner edges of the blades are each provided with a T-shaped notch and supporting center discs are provided so dimensioned relative to the slots that when the plates are deformed during assembly with the blades, the outermost edges of the discs will be driven into firm interference relationship with the sides and/or the base of the slots.

Another object of the invention is the provision of a new and improved locking arrangement between the blades and supporting plate of a centrifugal blower wheel of the type described wherein the interengaging surfaces are at a substantial angle, i.e., greater than 45° and preferably 90° to the radial forces.

Another object of the invention is the provision of a new and improved blower wheel of the type described wherein the supporting discs have a circumferential bulge adjacent to but spaced from the edges with locked in internal stresses which act to resist centrifugal forces of the blades-disc attachment surfaces.

Other and more pertinent objects will appear to others upon a reading and understanding of this specification.

DRAWINGS

The invention may take physical form in certain parts and arrangements of parts, a preferred embodiment of which will be described in detail in this specification and illustrated in the accompanying drawings which form a part hereof and wherein;

FIG. 1 is a fragmentary axial view with the blades in cross section of a blower wheel illustrating a preferred embodiment of the invention;

FIG. 2 is a greatly enlarged fragmentary cross sectional view of FIG. 1 taken approximately on the line 3—3 thereof illustrating the two center discs before they have been axially collapsed to force the edges thereof into the slots of the T-shaped notches in the inner edges of the blades and also showing the disc flattening dies in position to shape the center discs;

FIG. 3 is a view similar to FIG. 2 but showing the blades in final assembled relationship with the center supporting plate and the disc flattening dies in closed position; and, FIG. 4 is a fragmentary cross sectional view of FIG. 3 taken approximately on the line 4—4 thereof which is on the plane of the base surface of the notch.

PREFERRED EMBODIMENT

Referring now to the drawings wherein the showings are for the purposes of illustrating a preferred embodiment of the invention and not for the purposes of limiting same, FIG. 1 shows a fragmentary axial or end view of a centrifugal blower wheel comprised of a plurality of axially extending, circumferentially spaced, arcuate in transverse cross section, blower blades A in assembled relationship with a center supporting plate B, the plate B being made up of a pair of identical discs 14 with portions 16 of their inner surfaces in abutting relationship defining a central radial plane 17 and their outer edges extending generally axially of the blower wheel.

The centers of the two discs each have axial openings 18 therethrough and hubs (not shown) are fastened therein, all as is conventional for receiving a supporting shaft (not shown) and transmitting torque from an external motor (not shown) to the blades A. FIGS. 2 and 3 also show in cross section a pair of flattening dies C for the discs 14.

The blades A may be of any desired gage metal and are formed by conventional stamping methods. The axial ends of the blades are held in assembled relationship by means of rings (not shown) which are crimped around the ends of the blades to hold them in a truly cylindrical configuration all as is conventional.

In accordance with the invention, the inner edge 28 of each blade has a radial notch 30 having axially extending slots 31 at the base to form what may be called a T-shaped notch. The notches are all spaced the same axial distance from the ends of the blades and form a groove into which the edges of the discs 14 are positioned as will appear.

Each notch is symmetrical about the radial plane 17 and is defined by (reading from the inner edge of the blade) a pair of first leg surfaces 32 which converge slightly towards each other in a radially outward direction, a pair of second leg surfaces 34 which are generally parallel to each other, a pair of inner head forming axially extending surfaces 36, a pair of slot base forming radially extending surfaces 38 and a single outer head defining surface 40. The inner head forming surfaces 36 and the second leg forming surfaces 34 intersect to form an abrupt angular corner 42. This corner could have a small radius without departing from the invention.

The convergence of first leg forming surfaces 32 facilitates the insertion of the edges of the center plate discs. Such convergence is conventional and may either be eliminated or may extend all the way to the corner 42 as is desired, it of course being appreciated that if the first leg defining surfaces 32 extend to the corner 42, there will then be no second leg forming surfaces 34.

Surfaces 36 are preferably parallel to the axis of the wheel, that is to say perpendicular to the radial plane.

The two discs 14 in the preferred embodiment are identical and only one will be described. These discs are progressively formed by stamping from sheet metal and in the finished but preassembled state (See FIG. 2) include (reading from the center) a flat portion 50, a radially outwardly and axially inwardly sloping conical portion 52, a radially relatively narrow flat portion 54, an axially outwardly angled portion 56, an arcuate portion 58 integrally connecting the portion 56 to an inwardly angled portion 60, an arcuate portion 62 integrally connecting the outer edge of the portion 60 with a portion 64 angled axially outwardly at an angle of 45°. Portions 54 and 62 of the two discs have surfaces 16 and 63 which abut to define a radial plane 17, and axially outwardly as used herein is in relation to this plane 17. Angles as hereinafter described will be in relation to this plane 17.

The outermost edge 70 of each disc is beveled relative to the conical plane of the portion 64 to provide a sharp corner 72 on the outermost edge of the disc for purposes as will be described hereinafter. The amount of beveling may be as desired but is preferably at an angle of 90°, i.e., 45° relative to the conical plane of the portion 64. The surface 70 is in fact a cylindrical surface of relatively short axial length formed by the shearing action of the forming dies.

The angle of the portion 52 is unimportant to the invention. The angle a of the portion 56 is preferably 19° although it can be more or less. The radius of curvature b of the arcuate portion 58 is preferably 0.62" although it will be appreciated it can be more or less. The angle c of the portion 60 is, in the preferred embodiment, 75° although it will be appreciated that it can be more or less. The radius d of the arcuate portion 62 is preferably 0.036" although it will be appreciated it can be more or less. The inner surface 63 of this radiused portion 62 is generally coplanar with the surface 16. The angles and radii of portions 56, 58, 60 and 62 form what may be termed a "bubble" adjacent the outer edge of the disc which will be partially flattened by the dies C when they are closed. The total height h of the bubble is approximately 0.176".

The angle e of the portion 64, as previously indicated, is preferably 45° although it will be appreciated that it can be more or less while still being within the scope of the invention.

The discs 14 are coaxially positioned with surfaces 16 and 63 in abutment on central plane 17 to form the center plate B. So assembled, the corners 72 are spaced apart a distance of approximately 0.315". Correspondingly, the spacing between the leg defining surfaces 34 is just slightly greater than this spacing so that the blades A may be readily assembled with the plate B with the surfaces 70 in abutting engagement with the surfaces 40. The slot bases 38 in the preferred embodiment are spaced apart a distance of 0.377" which, as will appear, is a distance less than the distance which the corners 72 would assume when the bubbles 58 are flattened during assembly of the blades with the plate B.

The discs 14 have a thickness of 0.036" to 0.042" while the slots 31 have a width of 0.043". The disc edges can thus move freely into the slots 31 but with a sufficiently small clearance that with the plastic flow of the metal in the outer edges of the discs, the edges will not only firmly engage the bases 38 but the sides 36, 40 of the slots.

The angle c is greater than the angle e. Thus, when the flattening dies C are brought into engagement with the conical portion 56 with sufficient force to flatten the inner portion of the bubble, the conical portion 64 will be rotated through an angle approximately equal to the angle c with the result that the portion 64 if not restrained by the sides of the T-shaped notch 30 will be rotated through an angle in excess of 45° to a position such that the angle e relative to the plane 17 will be in excess of 90°.

To manufacture the blower wheel of the present invention, the two discs 14 are placed with surface 16 and 63 in a jig and a sufficient number of blades to form a complete cylinder are placed circumferentially spaced therearound with the outer edges of the two discs positioned in and based in the notches 30 as shown in FIG. 2. Thereafter, end rings (not shown) are assembled with the blades in a conventional manner.

The dies C are then moved axially to flatten the bubble formed by portions 56, 58 and 60. These dies are generally cylindrical rings having an inner diameter at least equal to the diameter of the portion 54 and an outer diameter just slightly less than the inner diameter of the cylinder formed by the inner edges of the blades. The diameter of the portion 62 and thus the diameter of the engaging surfaces 63 is slightly greater than the outer diameter of the dies C and in fact slightly greater than the inner diameter of the cylinder formed by the inner edges of the blades A. The dies C are moved axially towards each other with sufficient force to flatten out the inner portion of the bubble 56. As this flattening action occurs, the diameter of the portion 54 is restrained from changing diameter by the inner portions 50, 52 of the discs 14. However, as the portion 56 and 58 are flattened, the portions of the discs radially outwardly therefrom are not restrained from radial movement. The surfaces 63 are pressed together and move radially outwardly closer to the base 40 and the conical portions 64 rotate about the surface 63 such as to move in an axial direction. The outer edges thereof are driven forcibly into the slots 31 and against bases 38. The sharp corners 72 engage the bases 38 of the slots. The spacing of the bases 38 is fixed and as the dies C continue to close, the sharp corners 72 are deformed by the high pressure engagement with the bases 38 resulting in a plastic flow of the metal of the corners 72 and the formation of notches 90 in the corners 72, one for each blade A with the bases 38 therein and a bulging or mushrooming as at 91 on each circumferential side of the notch 90 and a bulging or mushrooming as at 92, 93 on the outer and inner surfaces of the outermost edge of the portions 64. These bulges or mushrooms 92, 93 however flow into interference or pressure relationship with the surfaces 40 and 36 respectively resulting in the outermost edge of the portions 64 being firmly bottomed in the bases of the slots 31 and in fact overlapping both sides of the bases, all as shown in FIGS. 3 and 4. Examination of ruptured blower wheels indicates that there is also a plastic flow of the metal forming the base of the slot as at 94.

Also, the outermost edges of portions 64 extend generally radially into the slots 31 with surfaces 84 pressure engaging the respective corners 42. Envelopement of corners 72 around slot bases 38 restrain further rotation of the portions 64 in the plane of the blades A. In between each blade A, the conical portion 64 is not restrained and continues to be rotated inwardly a small amount generally as is shown in FIG. 3 in dotted lines at 95. An axial view, as shown in FIG. 1, indicates that there is a slight inward curvature between the individual blades A from the original circular edge before assembly. The plastic deformation of edge 70 has caused a slight buckling of this edge, which is an indication of the high abutting pressures between the edges and the blades.

As above pointed out, the outer diameter of the dies C is less than the diameter of the portions 63 such that the radially inner portions 56' of portions 56 are completely flattened and in abutting engagement with each other. There remains radially out of the dies C a small bubble 58', the surfaces of which have residual tension and/or compression stresses which act to continuously bias the outer edges of the portions 64 in an axial direction into pressure engagement with the slot bases 38. These residual forces are indicated generally by the stress arrows in FIG. 3. Additionally, the surfaces 63 are in pressure abutting relationship and disposed generally within the confines of the notches 30.

It will thus be seen that a T-shaped notch is provided on the inner edge of each blade which is so dimensioned relative to the dimension of the discs 14 prior to final assembly that on final assembly when the circumferential bubble in the surfaces of the discs is flattened, the outer edges of the two discs will be firmly based within the slots 31 not only with notches being formed in the outermost edges of the discs by the plastic flow due to the pressure engagement with the bases 38 of the slots 31 but in engagement with the sides 36 and 40 of the slots and the corner 42 to give a secure, strong attachment of the center plate to the blades such that blower wheels manufactured in accordance with the present invention have a substantially improved bursting strength and torque strength over that of the structures shown in the patents to Mayne, Baker and/or Merz for comparable size wheels.

In analyzing the reasons for the increased bursting strength of the wheels embodying the present invention, it became apparent that with a notch having parallel side walls, the centrifugal forces on the blades would be resisted first by the structural strength of the blades and when this is exceeded, by the friction of the outer edges of the discs on the edges of the slots.

With the notches having outwardly diverging side walls, there was some improvement. However, the centrifugal force of the blades is transmitted to the edges of the discs through surfaces at an angle relative to the radial plane. These forces create an axial force on the edges of the discs which is equal to the cotangent of the angle of divergence times the radial force. With an angle of 8°, as is shown in the patent to Merz (determined by scaling from the drawing), the axial forces on the outer edges of the discs can be calculated to be in excess of seven times the radial force of the blades on the edges of the discs. The cotangent of 8° is 7.115.

In the present invention, however, because the sides of the outer edges of the discs are essentially parallel to the slot sides, the angle of engagement is approximately 90°, 80°–85° relative to the center plane (the cotangent of 90° is 0.000), there is no axial direction whereby the blades can move radially and the wheel rupture and fail.

Another reason believed contributing to the success of the present invention is the fact that if the corner 42 engages the surface 84 of the portion 64, it does so only a short distance f from the plane 17 resulting in a small moment arm, which moment arm of course acts to bend the outer edge of the disc edges outwardly to where the surfaces 34 can crowd therepast with resultant bursting of the blower wheel.

The invention has been described with reference to a preferred embodiment. Obviously modifications and alterations will occur to others upon a reading and understanding of this specification and it is my intention to include all such modifications and alterations insofar as they come within the scope of the appended claims.

Having thus described my invention, I claim:

1. In a centrifugal type blower wheel comprised of a plurality of axially-extending, circumferentially-spaced blower blades and a central supporting plate comprised of a pair of axially abutting discs, each blade having on its inner edge of T-shaped notch consisting of a T-leg defined by a radially extending opening and a T-head defined by a radially inwardly facing side surface, spaced opposed axially facing base surfaces, and axially spaced radially outwardly facing side surfaces one on each side of said T-leg, said surfaces forming an axially extending slot at the base of the notch, the improvement which comprises: radially outer portions of the discs abutting within the notch and having further outer portions extending generally parallel to the axis into said slots.

2. The improvement of claim 1 wherein the outer edge of each disc has a plurality of circumferentially spaced notches, one for each blade, with the base of each notch abutting a base surface.

3. The improvement of claim 1 wherein the radial width of the slots is just greater than the thickness of the metal of the discs and the edges of said discs adjacent the base of said slots are plastically radially deformed into pressure engagement with the radially inner and outer facing surfaces of said slots.

4. The improvement of claim 1 wherein the outer edge of each disc is beveled to provide a sharp corner, said corner has a plurality of notches, one for each blade, and the radial width of the slots is just greater than the thickness of the edges of the discs and the sides of the edges of the discs are plastically and radially deformed and in pressure engagement with the sides of the slots.

5. The improvement of claim 2 wherein the plane of the outer edges of the discs in the slots is at an angle of at least 70° relative to a radial plane.

6. The improvement of claim 2 wherein the plane of the outer edges of the discs in the slots is at an angle of at least 80° relative to a radial plane.

7. The improvement of claim 1 wherein the edges of the discs between the blades are at an angle in excess of 90° relative to the plane defined by the abutting surfaces of the discs.

8. A center disc for a centrifugal blower fan, said disc having an outer edge diverging from the plane of the disc at an angle of approximately 45° and a portion radially inwardly of the outer portion diverging from the plane of the disc towards an axis of the disc at an angle between 45° and 75° whereby when said last mentioned portion is at least partially flattened, the first mentioned portion will be rotated to an angle of approximately 90° relative to the plane of the disc.

9. The improvement of claim 4 wherein the base of each outer edge notch extends beyond the sides of said edge into pressure engagement with said inner and outer surfaces adjacent said base surfaces.

10. The improvement of claim 2 wherein the side surfaces of said disc notches are in pressure engagement with the sides of said blades adjacent the surfaces of said slots.

11. The improvement of claim 10 wherein the base of said edge notches extends beyond the sides of said edge into pressure engagement with the sides of said slot adjacent the base thereof.

12. The improvement of claim 1 wherein at least one disc adjacent to but spaced from its outer edge has a circumferentially extending bubble with the surfaces on each radial side of said bubble in abutting engagement with the opposite discs.

13. The improvement of claim 12 wherein the surfaces adjacent to said bubble have residual compression and tension stresses therein acting to resiliently bias the edges of said discs against the bases of said slots.

14. The method of manufacturing a centrifugal type blower wheel starting with a plurality of blower blades each having a T-shaped notch in one edge thereof, said notch having T-leg defining surfaces and T-head defining surfaces including a radially inwardly facing surface, a pair of axially spaced opposed end surfaces and a pair of axially spaced radially outwardly facing surfaces; providing a pair of identical circular discs each having a circumferentially extending bubble spaced from the outer edge thereof and an outer edge diverging from each other and at an angle from the plane of said disc in excess of 30°, said disc having a coplanar circumferentially extending surfaces, one intermediate said bulge and said angularly extending portion and one between said portion and the center of said disc; comprising the steps of: assembling said blades around said discs with the outer edges of said discs in said notches; axially flattening at least a portion of said bubble causing the angular portions to rotate in directions away from each other and into the T-head portion of said notches with sufficient pressure against the base surfaces as to cause plastic flow of the metal in said edges whereby to form notches in said edges with said base surfaces embedded therein and with the sides of said edges in abutting pressure engagement with the side surfaces adjacent the base surface.

* * * * *